(12) United States Patent
Ngahu

(10) Patent No.: US 10,153,662 B2
(45) Date of Patent: Dec. 11, 2018

(54) WIRELESS TRANSMISSION DEVICE

(71) Applicant: YAZAKI CORPORATION, Tokyo (JP)

(72) Inventor: Antony Wambugu Ngahu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 233 days.

(21) Appl. No.: 15/208,403

(22) Filed: Jul. 12, 2016

(65) Prior Publication Data

US 2017/0018968 A1 Jan. 19, 2017

(30) Foreign Application Priority Data

Jul. 17, 2015 (JP) .................................. 2015-142624

(51) Int. Cl.
*H02J 50/12* (2016.01)

(52) U.S. Cl.
CPC .................................... *H02J 50/12* (2016.02)

(58) Field of Classification Search
None
See application file for complete search history.

(56) References Cited

U.S. PATENT DOCUMENTS

| 6,198,619 B1 | 3/2001 | Fujioka | |
| 2014/0320090 A1* | 10/2014 | Keeling | B60L 11/1829 320/162 |
| 2015/0015197 A1* | 1/2015 | Mi | B60L 11/182 320/108 |

FOREIGN PATENT DOCUMENTS

| JP | 9-182324 A | 7/1997 |
| JP | 9-322393 A | 12/1997 |
| JP | 11-307389 A | 11/1999 |

OTHER PUBLICATIONS

Japanese Office Action for the related Japanese Patent Application No. 2015-142624 dated May 23, 2017.
Japanese Office Action for the related Japanese Patent Application No. 2015-142624 dated Mar. 14, 2017.

* cited by examiner

*Primary Examiner* — Jared Fureman
*Assistant Examiner* — Aqeel Bukhari
(74) *Attorney, Agent, or Firm* — Kenealy Vaidya LLP

(57) ABSTRACT

A wireless transmission device includes a coil that generates a magnetic field; and a resonant power-storage element module that is electrically coupled to a coil, is capable of storing electric power, and forms a resonant circuit corresponding to a power transmission frequency together with the coil when transmitting electric power via the coil. The resonant power-storage element module is formed by connecting a plurality of power storage elements in parallel to form a parallel group, connecting a plurality of such parallel groups in series to form a parallel-series group, and connecting a plurality of such parallel-series groups in parallel.

1 Claim, 4 Drawing Sheets

WIRELESS TRANSMISSION DEVICE

CROSS-REFERENCE TO RELATED APPLICATION(S)

The present application claims priority to and incorporates by reference the entire contents of Japanese Patent Application No. 2015-142624 filed in Japan on Jul. 17, 2015.

BACKGROUND OF THE INVENTION

1. Field of the Invention

The present invention relates to a wireless transmission device.

2. Description of the Related Art

As a conventional wireless power-feeding system, Japanese Patent Application Laid-open No. 9-182324 discloses a power supply device for vehicular accessory electronic devices. The power supply device includes a power source provided on a vehicle body, a power supply unit provided on a panel of the vehicle body and coupled to the power source, a power receiving unit that receives electric power from the power supply unit, and an accessory electronic device that operates by the electric power from the power receiving unit. In the power supply device, the power supply unit includes a conversion unit that converts the electric power from the power source into a high frequency, and a primary coil to which the high frequency is supplied from the conversion unit. The power receiving unit includes a secondary coil that receives the high frequency from the primary coil. The accessory electronic device is provided such that the power source thereof is operable by receiving the electric power by the high frequency of the secondary coil.

The power supply device disclosed in the above-described Japanese Patent Application Laid-open No. 9-182324 may include a group of resonant capacitors that form a resonant circuit together with a coil, for example. However, in terms of detecting a short circuit of a capacitor element, there is room for further improvement.

SUMMARY OF THE INVENTION

The present invention is made in view of the above-described circumstances, and an object of the present invention is to provide a wireless transmission device that is capable of properly detecting a short circuit while suppressing heat generation of the element.

In order to achieve the above mentioned object, a wireless transmission device according to one aspect of the present invention includes a coil that generates a magnetic field; and a resonant power-storage element module that is electrically coupled to the coil, is capable of storing therein electric power, and forms a resonant circuit corresponding to a power transmission frequency together with the coil when transmitting electric power via the coil. Here, the resonant power-storage element module is formed by connecting a plurality of power storage elements in parallel to form a parallel group, connecting a plurality of such parallel groups in series to form a parallel-series group, and connecting a plurality of such parallel-series groups in parallel.

According to another aspect of the present invention, in the wireless transmission device, it is possible to configure that a short circuit of any of the power storage elements is detected based on changes in reactance of the resonant circuit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes in detail an exemplary embodiment according to the present invention based on the accompanying drawings. The invention, however, is not intended to be limited by the embodiment. The constituent elements in the following embodiment include those of substitutable and easy objects by a person skilled in the art, or those of substantially the same.

Embodiment

Figure 1:
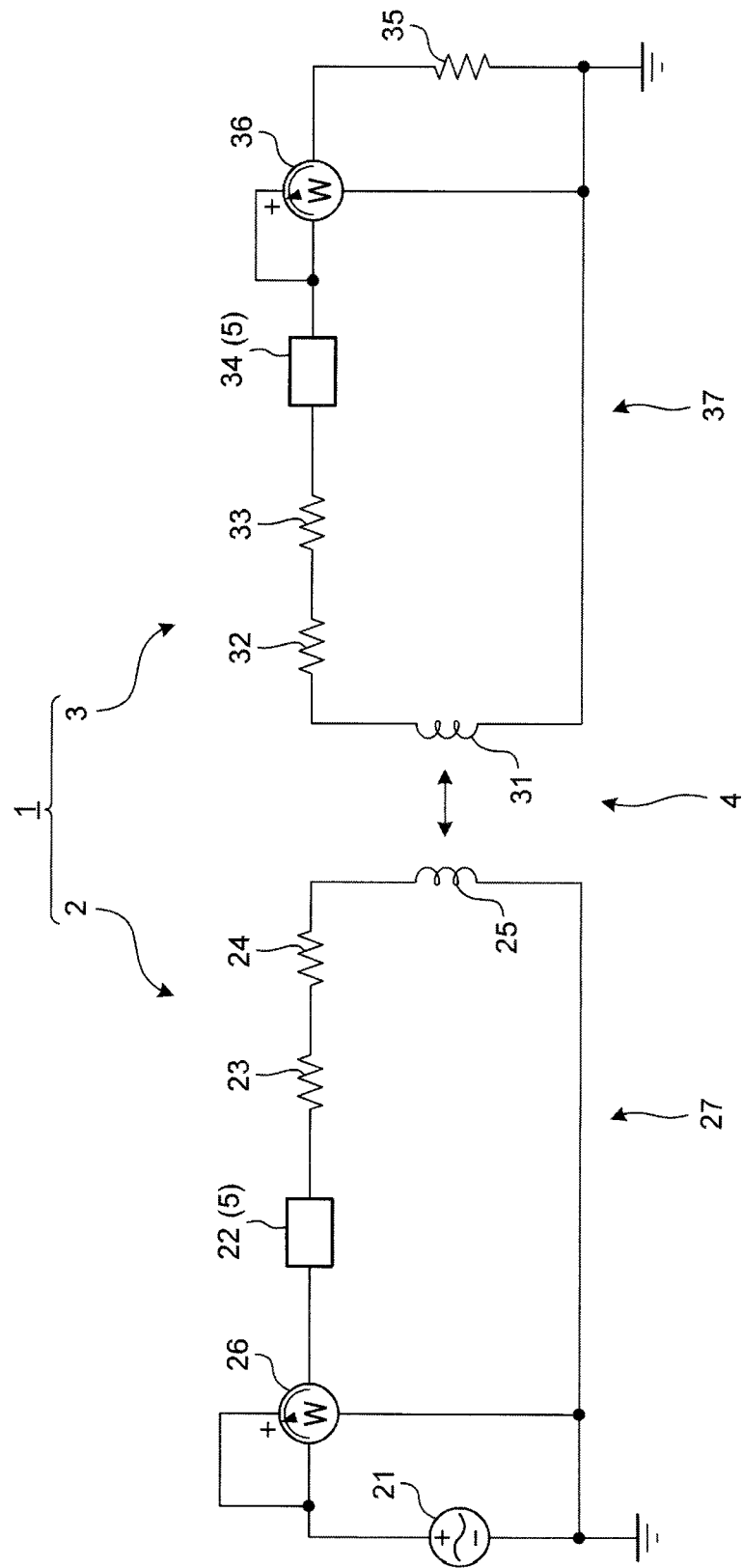
FIG. 1 is a block diagram schematically illustrating a configuration of a wireless power-feeding system according to an embodiment.
Figure 2:
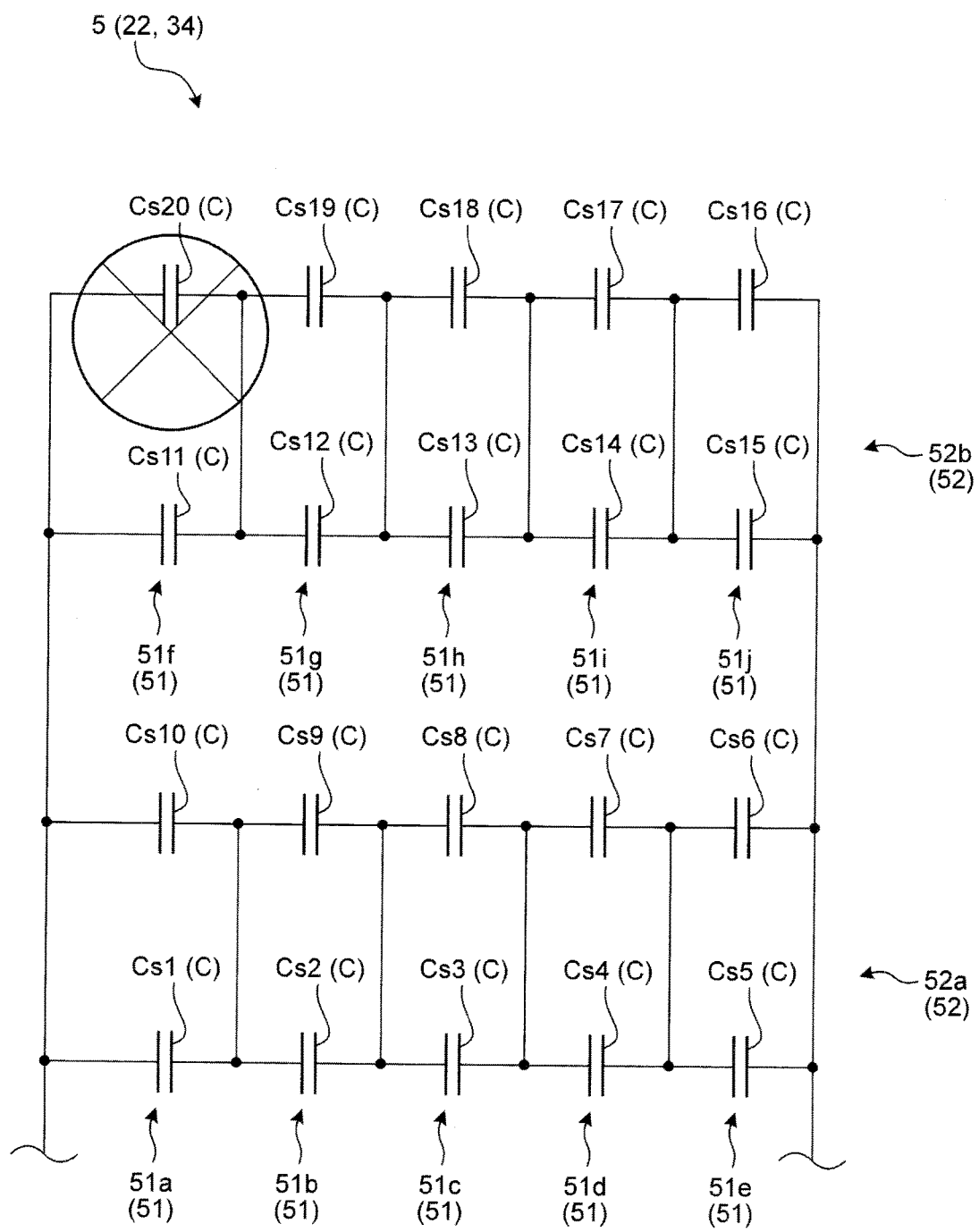
FIG. 2 is a block diagram schematically illustrating a configuration of a resonant capacitor module of the wireless power-feeding system in the embodiment.

FIG. 1 is a block diagram schematically illustrating a configuration of a wireless power-feeding system according to an embodiment. FIG. 2 is a block diagram schematically illustrating a configuration of a resonant capacitor module of the wireless power-feeding system in the embodiment.

A wireless power-feeding system 1 in the embodiment illustrated in FIG. 1 is a non-contact power-feeding system in which, when electric power from a power source 21 is transmitted to an electrical load 35 of various types, at least a part thereof is transmitted in a wireless manner. The wireless power-feeding system 1 in the embodiment is installed in a vehicle and the like and makes the electrical connection with the electrical load 35 of various types disposed in the cabin of the vehicle in a wireless manner as non-contact electric power transmission, for example.

Specifically, the wireless power-feeding system 1 includes a power transmission device 2 as a wireless transmission device, and a power receiving device 3 as a wireless transmission device.

The power transmission device 2 includes the power source 21, a resonant capacitor module 22 as a resonant power-storage element module, a power transmitting coil 25, and a wattmeter 26. The power source 21 generates high-frequency electric power with a battery mounted on the vehicle as a power source and supplies the high-frequency electric power to the resonant capacitor module 22 and the power transmitting coil 25, for example. The resonant capacitor module 22 and the power transmitting coil 25 are electrically coupled to the power source 21 in series. One terminal of the resonant capacitor module 22 is electrically coupled to the anode (+) of the power source 21 and the other terminal thereof is electrically coupled to one terminal of the power transmitting coil 25. Note that resistors 23 and 24 schematically represent resistance components of the circuit (for example, the resistance components in the power transmitting coil 25), and typically the resistor 23 represents a DC resistance component (Rdc) and the resistor 24 represents a resistance component by the high frequency (Rac). The other terminal of the power transmitting coil 25 is electrically coupled to the cathode (−) of the power source 21. The cathode (−) of the power source 21 is earthed. The power transmitting coil 25 generates a magnetic field. The resonant capacitor module 22 is electrically coupled to the power transmitting coil 25 and is capable of storing electric power. The resonant capacitor module 22 forms a resonant circuit (LC resonant circuit) 27 that corresponds to a predetermined power transmission frequency (resonant frequency) together with the power transmitting coil 25 when transmitting the electric power via the power transmitting coil 25. The resonant circuit 27 can store the electric power that oscillates at the power transmission frequency. Although the resonant capacitor module 22 is coupled to the power transmitting coil 25 in series connection, the resonant capacitor module 22 may be coupled to the power transmitting coil 25 in parallel connection. The wattmeter 26 is electrically coupled to the resonant capacitor module 22 and the power transmitting coil 25 in series connection and in parallel connection, and measures the electric power (current and voltage) of the resonant circuit 27. The configuration of the resonant capacitor module 22 will be described later.

The power receiving device 3 includes a power receiving coil 31, a resonant capacitor module 34 as a resonant power-storage element module, the electrical load 35, and a wattmeter 36. The power receiving coil 31, the resonant capacitor module 34, and the electrical load 35 are electrically coupled in series. One terminal of the power receiving coil 31 is electrically coupled to one terminal of the resonant capacitor module 34. Note that resistors 32 and 33 schematically represent the resistance components of the circuit (for example, the resistance components in the power receiving coil 31), and typically the resistor 32 represents a DC resistance component (Rdc) and the resistor 33 represents a resistance component by the high frequency (Rac). The other terminal of the resonant capacitor module 34 is electrically coupled to one terminal of the electrical load 35. The other terminal of the electrical load 35 is electrically coupled to the other terminal of the power receiving coil 31. The electrical load 35 is a variety of electrical devices that operate by consuming the electric power supplied from the wireless power-feeding system 1, and a plurality of electrical devices may be coupled in series or in parallel. The other terminal of the power receiving coil 31 is earthed. The power receiving coil 31 generates a magnetic field. The resonant capacitor module 34 is electrically coupled to the power receiving coil 31 and is capable of storing electric power. The resonant capacitor module 34 forms a resonant circuit (LC resonant circuit) 37 that corresponds to the predetermined power transmission frequency (resonant frequency) together with the power receiving coil 31 when transmitting the electric power via the power receiving coil 31. The resonant circuit 37 can store the electric power that oscillates at the power transmission frequency. Although the resonant capacitor module 34 is coupled to the power receiving coil 31 in series connection, the resonant capacitor module 34 may be coupled to the power receiving coil 31 in parallel connection. The wattmeter 36 is electrically coupled to the power receiving coil 31 and the resonant capacitor module 34 in series and in parallel, and measures the electric power (current and voltage) of the resonant circuit 37. The configuration of the resonant capacitor module 34 will be described later.

The power transmitting coil 25 of the power transmission device 2 transmits to the power receiving coil 31 the electric power that is supplied from the power source 21. The power receiving coil 31 of the power receiving device 3 receives the electric power from the power transmitting coil 25 in a non-contact manner. A pair of the power transmitting coil 25 and the power receiving coil 31 are both formed with a spirally or helically wound conductor coil, and by facing each other in the axial direction, form a set of non-contact power-feeding transformer 4, for example. The non-contact power-feeding transformer 4 is capable of transmitting electric power to the power receiving coil 31 from the power transmitting coil 25 in a non-contact manner by an electromagnetic-field resonance system (magnetic-field coupling system), for example. The electromagnetic-field resonance system is a system that causes the power transmitting coil 25 and the power receiving coil 31 to resonate at a specific power transmission frequency by making an AC current flow through the power transmitting coil 25 and that transmits electric power to the power receiving coil 31 from the power transmitting coil 25 by using a resonance phenomenon of the electromagnetic field.

In more detail, in the non-contact power-feeding transformer 4, when transmitting electric power to the power receiving coil 31 from the power transmitting coil 25, an AC current of a high frequency corresponding to the power transmission frequency is supplied to the power transmitting coil 25 from the power source 21 in a state that the power transmitting coil 25 and the power receiving coil 31 face each other leaving space between them in the axial direction. In the non-contact power-feeding transformer 4, when the AC current is supplied to the power transmitting coil 25, the power transmitting coil 25 and the power receiving coil 31 are electromagnetically coupled and the electric power from the power transmitting coil 25 is received by the power receiving coil 31 in a non-contact manner by the electromagnetic resonance. The electric power that the power receiving coil 31 has received is used by the electrical load 35. In the wireless power-feeding system 1, a rectifying and smoothing circuit and others may intervene between the power receiving coil 31 and the electrical load 35.

In the resonant capacitor modules 22 and 34 in the embodiment, as illustrated in FIG. 2, a plurality of capacitor elements C as power storage elements constituting the resonant capacitor modules 22 and 34 are electrically coupled in a predetermined array. This forms a configuration that enables a short circuit to be detected properly while suppressing heat generation of the elements. The resonant capacitor modules 22 and 34 in the embodiment are implemented forming an element array in which a plurality of capacitor elements C coupled in series and in parallel are interconnected, in order to withstand a large current and a high voltage.

The resonant capacitor module 22 and the resonant capacitor module 34 may, strictly speaking, be different in the number of capacitor elements C and in the capacitance thereof. However, the configurations of the resonant capacitor module 22 and the resonant capacitor module 34 are substantially the same, and the following describes them as being in common. In the following description, when it is not necessary to distinguish the resonant capacitor module 22 and the resonant capacitor module 34 specifically, they are referred to as resonant capacitor module 5.

The resonant capacitor module 5 in the embodiment is formed by connecting a plurality of capacitor elements C in parallel to form a parallel group 51, connecting a plurality of parallel groups 51 in series to form a parallel-series group 52, and connecting a plurality of parallel-series groups 52 in parallel. The resonant capacitor module 5 includes a total of 20 capacitor elements Cs1 to Cs20 as a plurality of capacitor elements C, and the element array is formed with the capacitor elements Cs1 to Cs20. In the following description, when it is not necessary to distinguish the capacitor elements Cs1 to Cs20 specifically, they are referred to simply as capacitor element C.

Specifically, in the resonant capacitor module 5, the capacitor element Cs1 and the capacitor element Cs10 are connected in parallel to form a parallel group 51a, the capacitor element Cs2 and the capacitor element Cs9 are connected in parallel to form a parallel group 51b, the capacitor element Cs3 and the capacitor element Cs8 are connected in parallel to form a parallel group 51c, the capacitor element Cs4 and the capacitor element Cs7 are connected in parallel to form a parallel group 51d, the capacitor element Cs5 and the capacitor element Cs6 are connected in parallel to form a parallel group 51e, the capacitor element Cs11 and the capacitor element Cs20 are connected in parallel to form a parallel group 51f, the capacitor element Cs12 and the capacitor element Cs19 are connected in parallel to form a parallel group 51g, the capacitor element Cs13 and the capacitor element Cs18 are connected in parallel to form a parallel group 51h, the capacitor element Cs14 and the capacitor element Cs17 are connected in parallel to form a parallel group 51i, and the capacitor element Cs15 and the capacitor element Cs16 are connected in parallel to form a parallel group 51j.

Then, in the resonant capacitor module 5, the parallel group 51a, the parallel group 51b, the parallel group 51c, the parallel group 51d, and the parallel group 51e are connected in series to form a parallel-series group 52a; and the parallel group 51f, the parallel group 51g, the parallel group 51h, the parallel group 51i, and the parallel group 51j are connected in series to form a parallel-series group 52b.

In the resonant capacitor module 5, the element array is formed by connecting the thus formed parallel-series group 52a and parallel-series group 52b in parallel.

The resonant capacitor module 5 is formed as in the foregoing, and this configuration enables the resonant capacitor module 5 to properly detect a short circuit while suppressing the heat generation of the elements.

Figure 3:
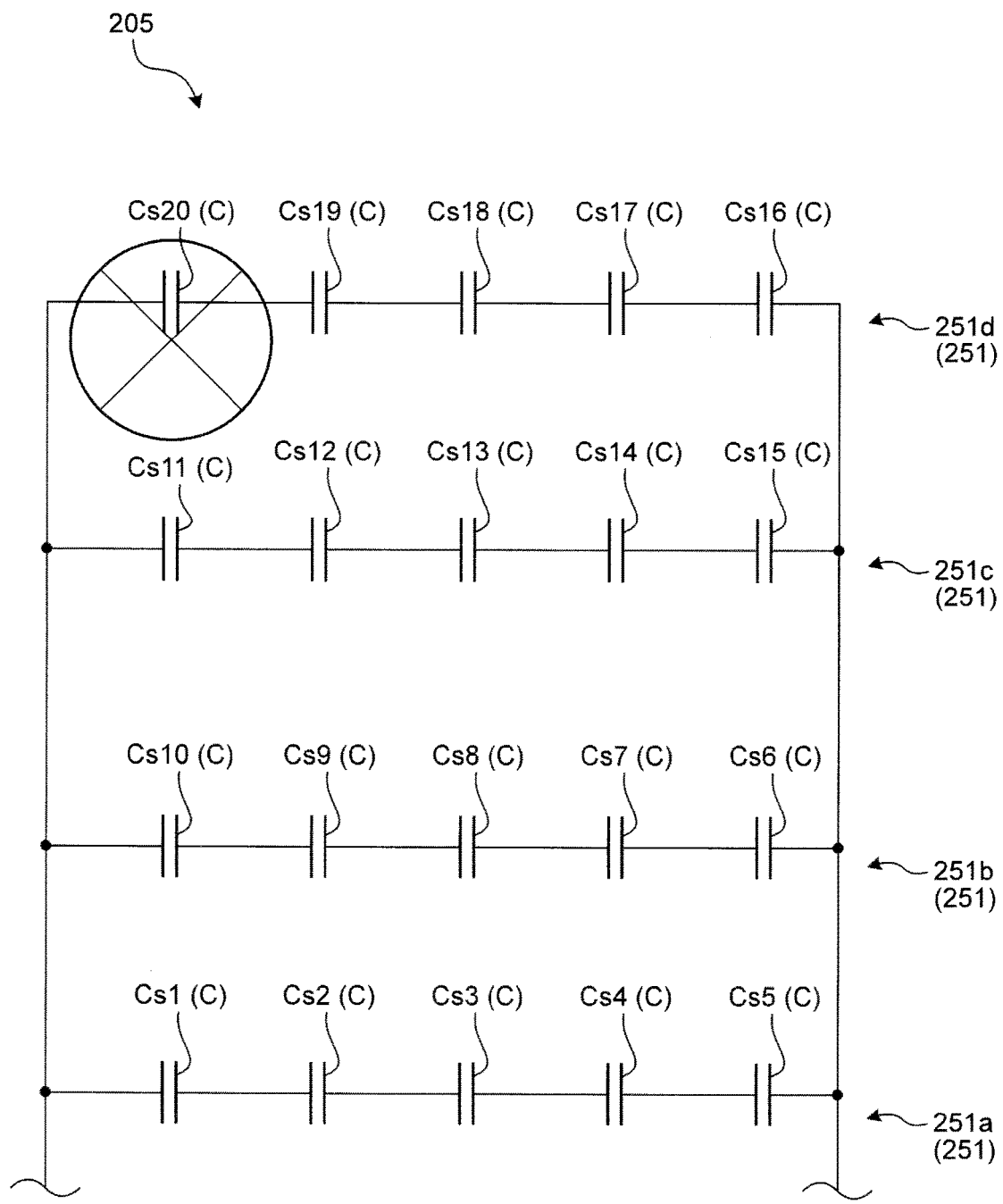
FIG. 3 is a block diagram schematically illustrating a configuration of a resonant capacitor module of a wireless power-feeding system according to a comparative example.
Figure 4:
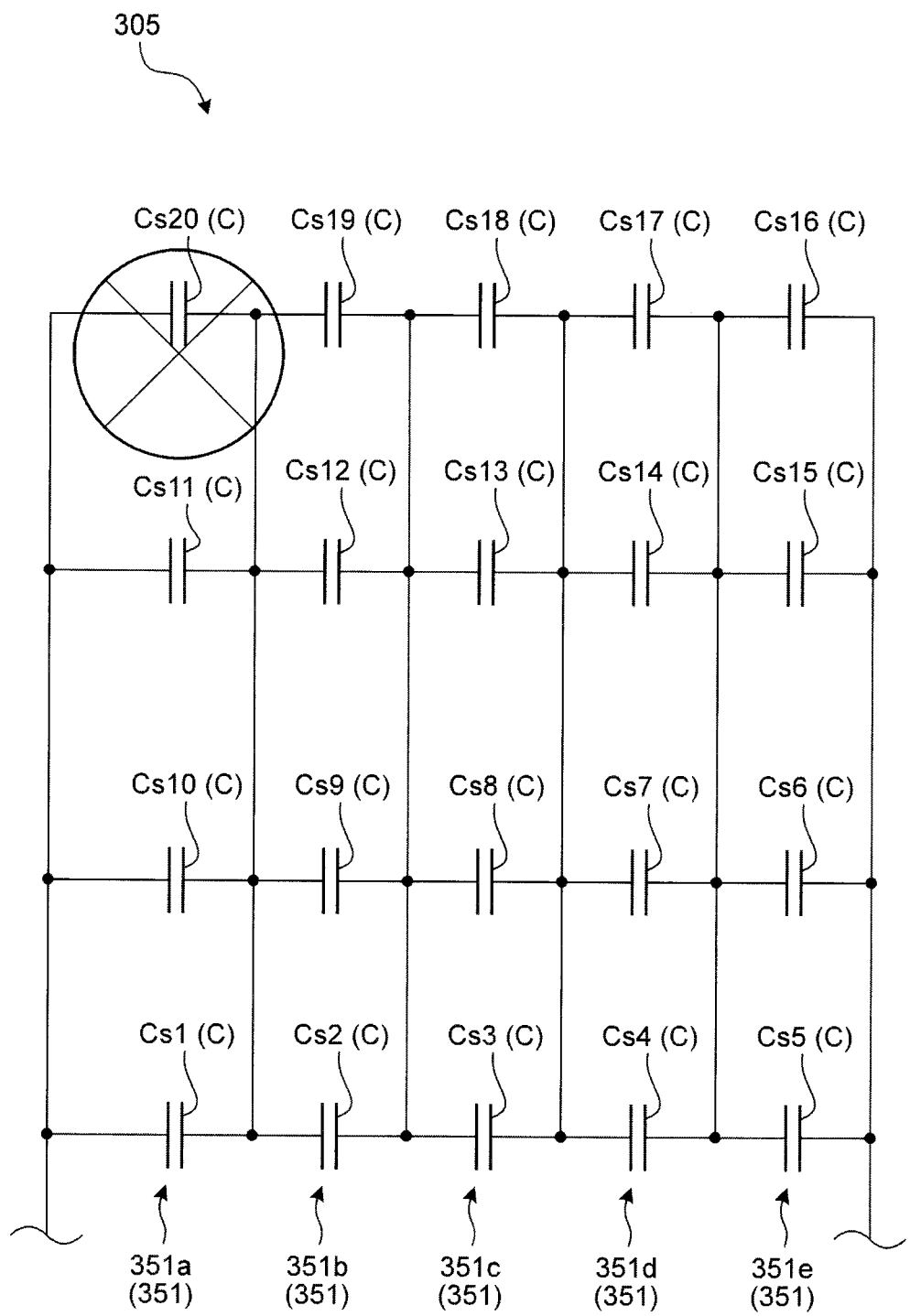
FIG. 4 is a block diagram schematically illustrating a configuration of a resonant capacitor module of a wireless power-feeding system according to a comparative example.

FIGS. 3 and 4 are block diagrams schematically illustrating the configurations of resonant capacitor modules according to comparative examples.

A resonant capacitor module 205 according to a comparative example illustrated in FIG. 3 is formed by connecting a plurality of capacitor elements C in series to form a series group 251 and connecting a plurality of series groups 251 in parallel. In the resonant capacitor module 205, the capacitor elements Cs1 to Cs5 are connected in series to form a series group 251a, the capacitor elements Cs10 to Cs6 are connected in series to form a series group 251b, the capacitor elements Cs11 to Cs15 are connected in series to form a series group 251c, and the capacitor elements Cs20 to Cs16 are connected in series to form a series group 251d. Then, in the resonant capacitor module 205, the element array is formed by connecting the series group 251a, the series group 251b, the series group 251c, and the series group 251d in parallel.

A resonant capacitor module 305 according to a comparative example illustrated in FIG. 4 is formed by connecting a plurality of capacitor elements C in parallel to form a parallel group 351 and connecting a plurality of parallel groups 351 in series. In the resonant capacitor module 305, the capacitor element Cs1, the capacitor element Cs10, and the capacitor element Cs20 are connected in parallel to form a parallel group 351a; the capacitor element Cs2, the capacitor element Cs9, the capacitor element Cs12, and the capacitor element Cs19 are connected in parallel to form a parallel group 351b; the capacitor element Cs3, the capacitor element Cs8, the capacitor element Cs13, and the capacitor element Cs18 are connected in parallel to form a parallel group 351c; the capacitor element Cs4, the capacitor element Cs7, the capacitor element Cs14, and the capacitor element Cs17 are connected in parallel to form a parallel group 351d; and the capacitor element Cs5, the capacitor element Cs6, the capacitor element Cs15, and the capacitor element Cs16 are connected in parallel to form a parallel group 351e. Then, in the resonant capacitor module 305, the element array is formed by connecting the parallel group 351a, the parallel group 351b, the parallel group 351c, the parallel group 351d, and the parallel group 351e in series.

The following describes a difference in operation with a case in which the capacitor element Cs20 out of a plurality of capacitor elements C is short-circuited as an example.

In the resonant capacitor module 205 in the comparative example, when the capacitor element Cs20 is short-circuited, the short circuit of the capacitor element Cs20 tends to be difficult to detect because the changes in electric characteristics (capacitance, current, and voltage) are relatively small. Meanwhile, in the resonant capacitor module 305 in the comparative example, when the capacitor element Cs20 is short-circuited, the short circuit of the capacitor element Cs20 tends to be easy to detect because the changes in electric characteristics (capacitance, current, and voltage) are relatively large. On the other hand, the electric current that flows through the capacitor element Cs20 that is a failed element becomes relatively large and the amount of heat generated at the capacitor element Cs20 tends to become relatively large.

In contrast, in the resonant capacitor module 5 in the embodiment, when the capacitor element Cs20 is short-circuited, the changes in electric characteristics (capacitance, current, and voltage) can be made sufficiently large as compared with the resonant capacitor module 205 and the like, and thus the short circuit of the capacitor element Cs20 can be reliably detected. As one example, in the resonant capacitor module 5, the short circuit of the capacitor element C is detected based on the changes in reactance of the resonant circuits 27 and 37. For example, in the resonant capacitor module 5, the measurements of the wattmeters 26 and 36 are monitored by a control device that is not depicted, and the short circuit of the capacitor element C is detected based on the measurements of the wattmeters 26 and 36. In the wireless power-feeding system 1, when the short circuit of the capacitor element C is detected, the electric power transmission is stopped by the control device not depicted, for example. In addition, in the resonant capacitor module 5, when the capacitor element Cs20 is short-circuited, the amount of heat generated at the capacitor element Cs20 can be suppressed because the electric current that flows through the capacitor element Cs20 that is a failed element can be made relatively small as compared with the resonant capacitor module 305 and the like. In the resonant capacitor module 5, it is preferable that the number of parallel-series groups 52 constituting the resonant capacitor module 5, the number of parallel groups 51 constituting each parallel-series group 52, the number of capacitor elements C constituting each parallel group 51, and the capacitance of each capacitor element C be defined such that the electric current that flows through a single capacitor element C never exceeds an allowable current when any of a plurality of capacitor elements C is short-circuited.

In the above-described power transmission device 2 and the power receiving device 3, included are the power transmitting coil 25 and the power receiving coil 31 that generate magnetic fields; and the resonant capacitor modules 22 and 34 that are electrically coupled to the power transmitting coil 25 and the power receiving coil 31, are capable of storing electric power, and form the resonant circuits 27 and 37 corresponding to the power transmission frequency together with the power transmitting coil 25 and the power receiving coil 31 when transmitting electric power via the power transmitting coil 25 and the power receiving coil 31. The resonant capacitor modules 22 and 34 are formed by connecting a plurality of capacitor elements C in parallel to form the parallel group 51, connecting a plurality of parallel groups 51 in series to form the parallel-series group 52, and connecting a plurality of parallel-series groups 52 in parallel.

Consequently, in the power transmission device 2 and the power receiving device 3, when any of a plurality of capacitor elements C constituting the resonant capacitor modules 22 and 34 is short-circuited, the changes in electrical characteristics (capacitance, current, and voltage) on the system can be made sufficiently large, and thus a short circuit of the capacitor element C can be reliably detected. Meanwhile, the amount of heat generated at the capacitor element C can be suppressed because the electric current that flows through the short-circuited capacitor element C can be made relatively small. As a result, the resonant capacitor module 5 can properly detect a short circuit while suppressing the heat generation of the element, and can properly detect the short circuit within the range of allowable current of the element, for example.

Furthermore, in the above-described power transmission device 2 and the power receiving device 3, a short circuit of the capacitor element C is detected based on the changes in reactance of the resonant circuits 27 and 37. Consequently, when any of a plurality of capacitor elements C is short-circuited, the short circuit can be detected early in a simple configuration, and a measure such as stopping the electric power transmission can be reliably performed, for example.

The wireless power-feeding system in the above-described embodiment of the present invention is not limited to that of the foregoing embodiment, and various modifications can be made within the scope stated in claims.

Although it has been described that the wireless power-feeding system 1 including the above-described wireless transmission device is installed in a vehicle, it is not limited to this.

In the above-described resonant capacitor modules (resonant power-storage element module) 5, 22, and 34, the number of parallel-series groups 52 constituting the resonant capacitor modules 5, 22, and 34, the number of parallel groups 51 constituting each parallel-series group 52, and the number of capacitor elements C constituting each parallel group 51 are not limited to the above-described numbers. In the parallel groups 51, the number of capacitor elements C constituting each parallel group 51 may be different from one another. Similarly, in the parallel-series groups 52, the number of parallel groups 51 constituting each parallel-series group 52 may be different from one another. It is not necessary that the capacitance of each capacitor element C is all equal.

In the foregoing explanation, it has been described that the resonant capacitor module 5 being arrayed as described above is applied to both the power transmission device 2 and the power receiving device 3. However, it is not limited to this, and it may be applied to only one of them.

In the wireless transmission device according to the present invention, when any of a plurality of power storage elements constituting a resonant-power storage element module is short-circuited, a short circuit of the power storage element can be reliably detected because the changes in electrical characteristics on the system can be made sufficiently large. Meanwhile, the amount of heat generated at the power storage element can be suppressed because the electric current that flows through the short-circuited power storage element can be made relatively small. As a consequence, the wireless transmission device has an advantageous effect in that it can properly detect a short circuit while suppressing the heat generation of the element.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless transmission device comprising:
   a coil that generates a magnetic field; and
   a resonant power-storage element module that is electrically coupled to the coil, is capable of storing therein electric power, and forms a resonant circuit corresponding to a power transmission frequency together with the coil when transmitting electric power via the coil, wherein
   the resonant power-storage element module is formed by connecting a plurality of power storage elements in parallel to form a parallel group, connecting a plurality of such parallel groups in series to form a parallel-series group, and connecting a plurality of such parallel-series groups in parallel, and
   a short circuit of any of the power storage elements is detected based on changes in reactance of the resonant circuit.

* * * * *